US007409755B2

(12) United States Patent
Smith et al.

(10) Patent No.: US 7,409,755 B2
(45) Date of Patent: Aug. 12, 2008

(54) PUSH ROD REMOVAL TOOL

(75) Inventors: Bradley T. Smith, Woodland Park, CO (US); Randall J. Ploeger, Clarinda, IA (US)

(73) Assignee: Lisle Corporation, Clarinda, IA (US)

( * ) Notice: Subject to any disclaimer, the term of this patent is extended or adjusted under 35 U.S.C. 154(b) by 0 days.

(21) Appl. No.: 11/377,477

(22) Filed: Mar. 16, 2006

(65) Prior Publication Data

US 2007/0017465 A1 Jan. 25, 2007

Related U.S. Application Data

(60) Provisional application No. 60/701,575, filed on Jul. 22, 2005.

(51) Int. Cl.
*B23P 19/04* (2006.01)

(52) U.S. Cl. .............................. 29/219; 29/270; 29/278

(58) Field of Classification Search .................. 29/219, 29/270–278, 220, 225
See application file for complete search history.

(56) References Cited

U.S. PATENT DOCUMENTS 5,775,673 A * 7/1998 Carnes et al. ............... 254/131
6,385,834 B2 * 5/2002 Thermos et al. ............... 29/278
2007/0017465 A1 * 1/2007 Smith et al. .............. 123/90.42

OTHER PUBLICATIONS

Terry Ford, Idea relating to Pushrod Removal Tool, Lisle Corporation Idea Disclosure Agreement, IDA No. 05-447, Oct. 17, 2005, Clarinda, Iowa.

Cameron Waters, Idea relating to 3.1-3.4 L. GM Rocker Arm Tool, Lisle Corporation Idea Disclosure Agreement, IDA No. 05-307, Jul. 27, 2005, Clarinda, Iowa.

* cited by examiner

*Primary Examiner*—Lee D Wilson
(74) *Attorney, Agent, or Firm*—Banner & Witcoff, Ltd.

(57) ABSTRACT

A tool useful for engaging and pivoting the rocker arm of an internal combustion engine in order to enable removal of a push rod from the engine by virtue of positioning the rocker arm in a manner that disengages the rocker arm from the push rod includes a pair of bifurcated arms which fit on opposite sides of the rocker arm and further includes cross members connecting the bifurcated arms which engage the rocker arm in a manner that facilitates manual rotation of the tool and the rocker arm.

6 Claims, 3 Drawing Sheets

PUSH ROD REMOVAL TOOL

CROSS REFERENCE TO RELATED APPLICATION

This is a utility application derived from, incorporating by reference and claiming priority to provisional application, Ser. No. 60/701,575 filed Jul. 22, 2005 entitled "Push Rod Removal Tool".

BACKGROUND OF THE INVENTION

The present invention relates to a tool useful for effecting removal of a push rod from an internal combustion engine block.

Typically, multiple stroke internal combustion engines include push rods which are mechanically linked to valves that open and close ports to the cylinders of the engine. Most often, each push rod is reciprocally driven in response to actuation by a rotating cam. The opposite end of each push rod typically engages a rocker arm which is biased into engagement with the push rod. Thus, as the cam rotates, the push rod reciprocates causing the rocker arm to pivot against the biasing force of a spring and thereby open various valve ports of the internal combustion engine.

A repair operation often necessary with respect to internal combustion engines is replacement of the intake manifold gasket. On some engines the push rods must be removed to allow the gasket surfaces to be cleaned and the new gasket installed. Removal of push rods from an internal combustion engine, however, is not a straightforward mechanical operation. Various means must be employed in order to move the rocker arm out of engagement with the push rod so that the push rod may be effectively removed and replaced. Factors which complicate replacement may include the time and effort to remove parts of the engine in order to secure adequate access to the push rods. An effective, efficient and simple means for removal of push rods thus is an objective long sought by engine mechanics.

SUMMARY OF THE INVENTION

Briefly, the present invention comprises a tool for engaging and biasing the rocker arm associated with an engine push rod in a manner which enables pivotal movement of the rocker arm out of engagement with the push rod so that the push rod may be easily removed and replaced. The tool is comprised of spaced, bifurcated lever arms which are joined together by means of transverse connecting or bridging members spaced from one another. The transverse or bridging members are designed to engage the rocker arm on opposite sides of the rocker arm pivot axis and thereby enable movement of the lever arm to effect rotation of the rocker arm out of engagement with the push rod. In this manner, by rotating the rocker arm about its axis and out of engagement with the push rod, the push rod may be removed from the engine block or easily replaced in the engine block.

In a preferred embodiment, the bifurcated spaced lever arms are positioned in opposite sides of the rocker arm and the transverse or cross members connecting the lever arms are engaged against the rocker arm on opposite sides of the pivot axis of the rocker arm so that the lever arms may be manually rotated thereby pivoting or rotating the rocker arm about its axis. The lever arms also include a means for effective extension of the lever arms by engagement with a socket wrench or socket lever. Further, the lever arms are in the form of flat blades that are notched in a manner which facilitates their use without removal or dislocation of various engine components such as valve covers.

Thus, it is an object of the invention to provide an improved tool capable of effecting rotational movement to an internal combustion rocker arm in order that the associated push rod for the internal combustion engine can be removed thus facilitating the necessary repair work.

A further object of the invention is to provide a tool which enables a mechanic to apply a mechanical advantage to pivot a rocker arm of an internal combustion engine.

Yet another object of the invention is to provide a rugged, yet economical tool useful for engaging a rocker arm in order to effect removal of a push rod from an internal combustion engine.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
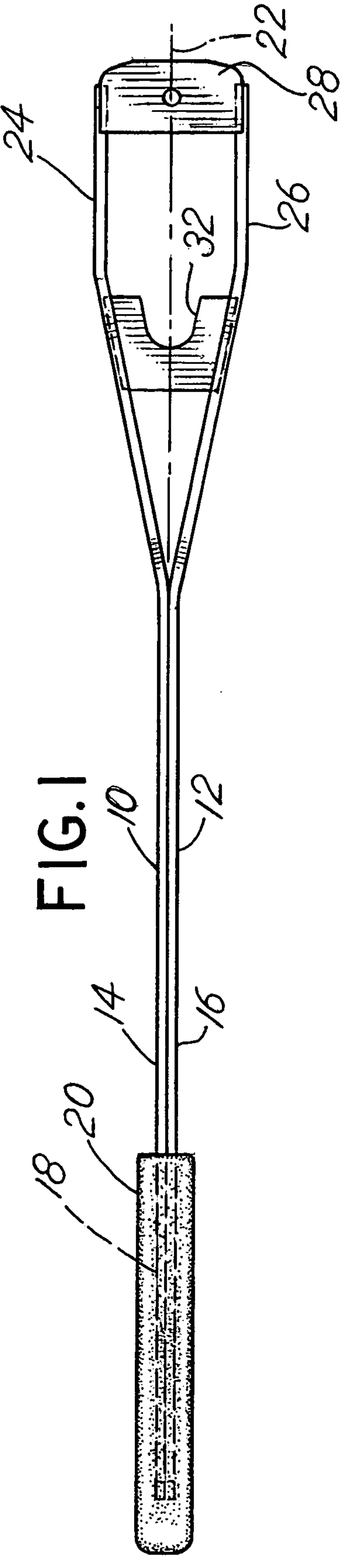
FIG. 1 is a top plan view of the push rod removal tool of the invention.
Figure 2:
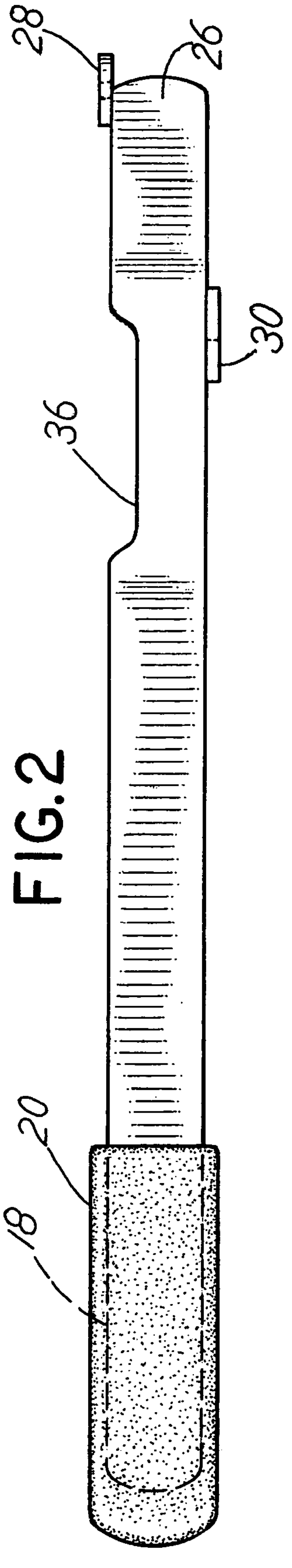
FIG. 2 is a side elevation of the tool of FIG. 1.
Figure 3:
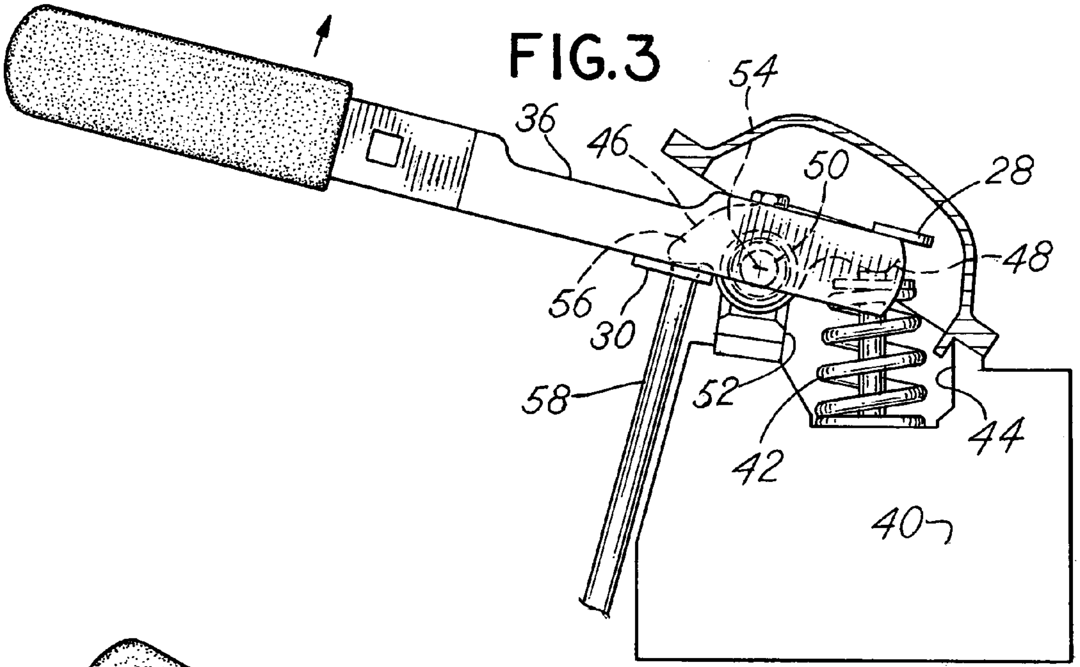
FIG. 3 is a side elevation of the tool of the invention positioned on the head of a vehicle engine in engagement with a rocker arm of the internal combustion engine.

FIGS. 1 and 2 illustrate the tool of the invention. The remaining FIGS. 3-6 illustrate the utility and function of the tool of the invention to effect removal of a push rod from an internal combustion engine and installation of the push rod in an internal combustion engine. The purpose and function of the tool of the invention is to engage an internal combustion engine rocker arm in a manner which will effect pivoting of the rocker arm about its pivot axis in a manner which compresses the spring that engages the rocker arm on one side of the rocker arm pivot axis so as to permit removal of a push rod associated with and engaged with the opposite side or end of the rocker arm.

That is, a typical internal combustion engine will include a plurality of rocker arms each mounted on a transverse pivot axis or shaft so as to have one end projecting outwardly from that pivot axis to engage a push rod associated with the operation of a cam of the internal combustion engine. The opposite end of the rocker arm is biased by a spiral compression spring mounted in a recess or counterbore in the cylinder head of the engine. The spring engages the rocker arm biasing it about its pivot axis into engagement with the push rod. An object of the invention is to provide a tool which will pivot the rocker arm against the compression force of the spring mounted on the cylinder head in a manner which enables the rocker arm to be moved independently away from engagement with the push rod so as to enable access and removal of the push rod as a result of the displacement of the rocker arm out of engagement with the push rod. FIGS. 1 and 2 therefore depict the tool itself and FIGS. 3-6 depict the utilization of the tool of FIGS. 1 and 2.

Referring therefore to FIGS. 1 and 2, the tool is comprised of a first elongate frame member 10 and a second generally mirror image elongate frame member 12. The frame member 12 is comprised of a longitudinal run 16 and the frame member 10 is comprised of a longitudinal run 14. The longitudinal runs 14 and 16 are joined together by welding or fasteners or the like and include a distal or hand grip end 18 with a molded hand grip 20 attached thereto. The frame members 10 and 12 extend in the range of 8 to 20 inches in longitudinal length along the longitudinal axis 22.

Frame members 10 and 12 further include, respectively, spaced rocker arm ends or runs 24 and 26 to engage the rocker arm. The arm ends 24, 26 are generally parallel and are spaced from one another approximately in the range of ¾ to 1 inch. A first, distal end plate 28 extends transverse to the axis 22 and connects the distal ends of the frame member arm engaging ends 24 and 26. The first end plate 28 is affixed to the ends 24 and 26 at the top side or top planar side of the ends 24 and 26.

Spaced inwardly from the end plate 28 is a second, transverse internal plate 30 attached to the lower sides of the ends 24, 26 of frame members 10 and 12. Plate 30 extends between runs 24, 26 and includes a notch 32 axially aligned with axis 22 and opening toward the first end plate 30.

The frame members 10, 12 are typically made from steel sheet or bands as depicted. The top surface detent notches 36 are sized and positioned so as to provide a space into which parts of the engine may fit when the frame members 10 and 12 are rotated as depicted. Thus, the notches 36 provide a means to avoid interference of the tool with component parts of the engine which are desirably maintained on the engine block and thus not required to be removed during the repair operation utilizing the tool of the invention. Each of the frame members 10 and 12 further includes a top surface detent notch 36 generally aligned with and extending inwardly from the notched plate 30. It is to be noted that the end plate 28 and the notched plate 30 are not coplanar but rather are affixed to the frame members 10 and 12 on the opposite or the top and bottom sides, respectively, thereof and generally extend along parallel planes defined by the top side and bottom side surfaces of the frame members 10 and 12.

Figure 6:
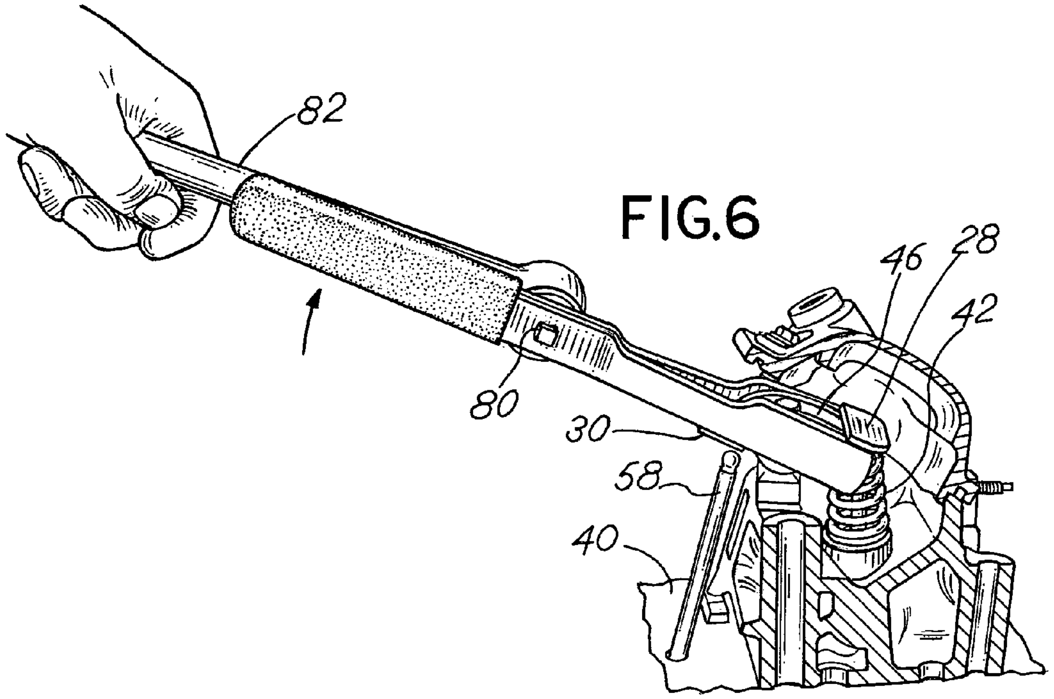
FIG. 6 is an isometric view of the tool of the invention illustrating the manner of use and illustrating further the incorporation of a driver in combination with the tool in order to provide additional mechanical advantage when using the tool.

As depicted in the Figures, an optional feature of the invention is the inclusion of a socket opening 80 formed in the frame members 10 and 12 and more particularly formed in the portion of the frame members which are joined together. The socket opening 80 is typically a square passage or polygonal shaped which enable the insertion of a socket wrench or other device so as to provide a longer lever arm or mechanical advantage during use of the tool. FIG. 6 illustrates this feature wherein the socket wrench arm 82 is positioned to engage a socket into the socket opening 80.

Referring to FIGS. 3-6 there is depicted the manner of use of the tool depicted in FIGS. 1 and 2. An engine or cylinder head 40 includes a valve spring 42 in a recessed pocket 44 engaged with a rocker arm 46 and, more particularly, the outer end 48 of the rocker arm 46. The rocker arm 46 is pivotal about a shaft 50 mounted on appropriate bearings that are supported on a rocker arm support element 52 extending from the cylinder head 40. The rocker arm 46 pivots about a transverse axis 54 of shaft 50 and includes an outer push rod engaging end 56 for engagement with a push rod 58.

Figure 4:
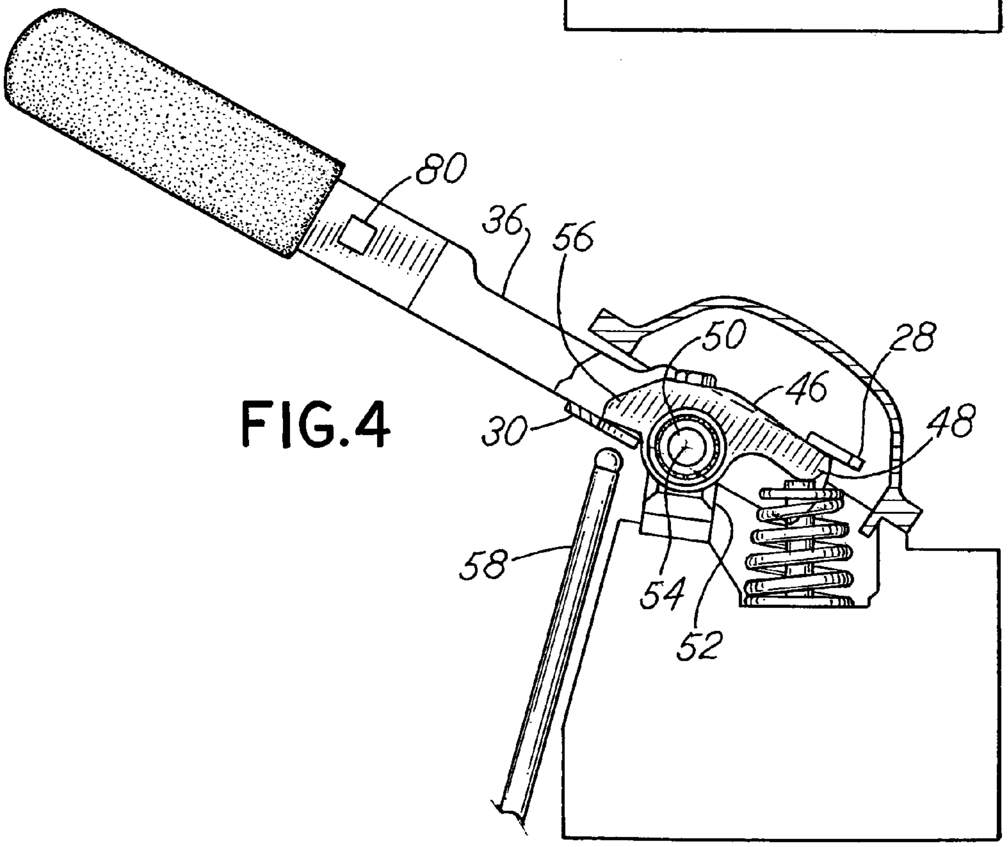
FIG. 4 is a partial cutaway view of the tool of FIG. 1 depicting the manner in which the rocker arm is engaged by the tool.
Figure 5:
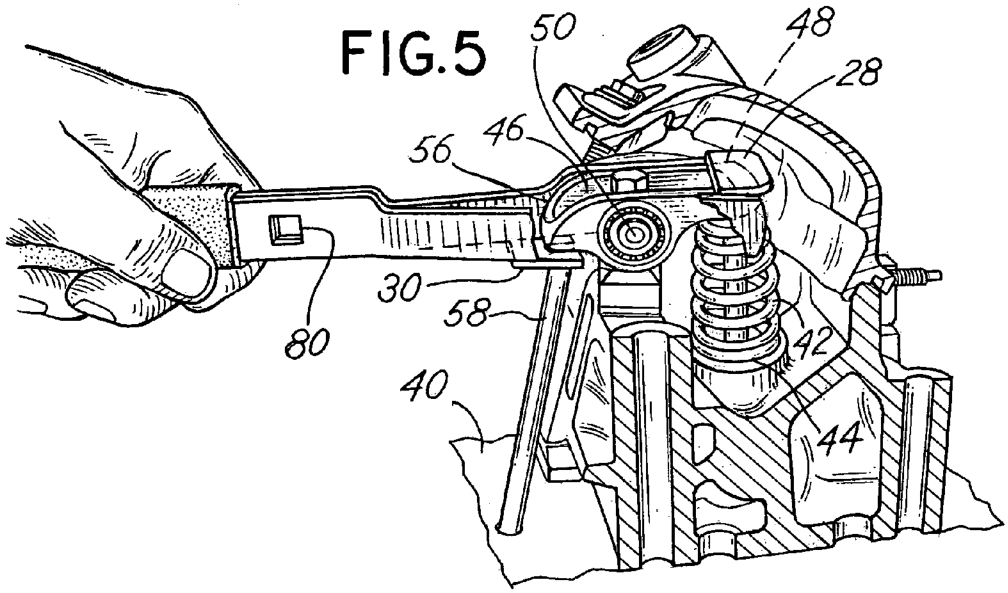
FIG. 5 is an isometric view of the tool of the invention that has been manipulated to compress the rocker arm spring so as to enable removal of a push rod from an internal combustion engine.

An object of the invention is to engage the tool depicted in FIGS. 1 and 2 with the rocker arm 46 so as to compress the spring 42 and thereby disengage the rocker arm 46 from the push rod 58. This is accomplished by placing the end plate 28 in contact with the outer end 48 of the rocker arm 46 and simultaneously placing the notched plate 30 against the opposite end 56 of the rocker arm 46. The tool is then manually manipulated by movement in the direction of the arrow in FIG. 3 to compress the spring 42 and thereby disengage the rocker arm 46 from the push rod 58 as depicted in FIG. 4. This is also depicted in FIGS. 5 and 6. The push rod 58 may then be removed from the engine and reinstalled or otherwise repairs may be effected to the engine.

While there have been set forth a preferred embodiment of the invention, it is to be understood that the invention is limited only by the following claims and equivalents.

What is claimed is:

1. A tool for engaging an engine rocker arm, said rocker arm having a first end and a second end, said rocker arm pivotally mounted intermediate the first and second ends said tool constructed to engage and to pivot the rocker arm in opposition to the biasing force of a valve spring engaging one the first end of the rocker arm thereby to enable removal or reinstallation of a push rod engageable with the ottae~second end of the rocker arm, said tool comprising, in combination:

an elongate lever arm comprising first and second, spaced, generally planar, elongate arm members with a first, generally distal rocker arm engaging end and an further comprising a second, opposite manual engagement end wherein said manual engagement end is a handle end, said lever arm including a generally longitudinal axis arm said first rocker arm engaging end including a first rocker arm engaging element extending between said arms generally transverse to the axis at the distal end and a second, separate generally transverse rocker arm engaging element extending between said arms and spaced longitudinally from the distal end toward the second, opposite end with an open space between said separate arms and said first and second elements, said first rocker arm engaging element and said second rocker arm engaging element spaced for positioning on opposite sides of said pivotal mounting of a rocker arm being non planar; wherein said arm members include a notch between said handle end and said distal end.

2. The tool of claim 1 wherein the second rocker arm engaging member includes a longitudinal notch opening toward the distal end.

3. The tool of claim 2 wherein the elongate lever arm is comprised of first and second substantially identical, elongate plate members joined at the manual engagement end and bifurcated at the rocker arm engaging end.

4. The tool of claim 1 wherein the first and second rocker arm engaging elements comprise noncoplanar, generally flat planar plates.

5. The tool of claim 4 wherein the elongate lever arm is comprised of first and second substantially identical, elongate plate members joined at the manual engagement end and bifurcated at the rocker arm engaging end.

6. The tool of claim 1 wherein the elongate lever arm is comprised of first and second substantially identical, elongate plate members joined at the manual engagement end and bifurcated at the rocker arm engaging end.

* * * * *